Dec. 1, 1936.  H. SCOTT  2,062,836
ANNEALING PROCESS
Filed Oct. 15, 1935
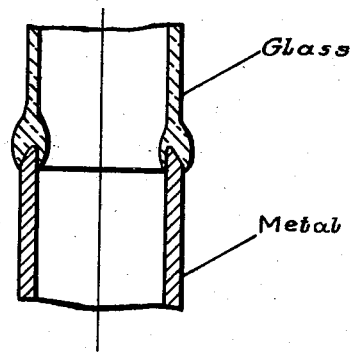
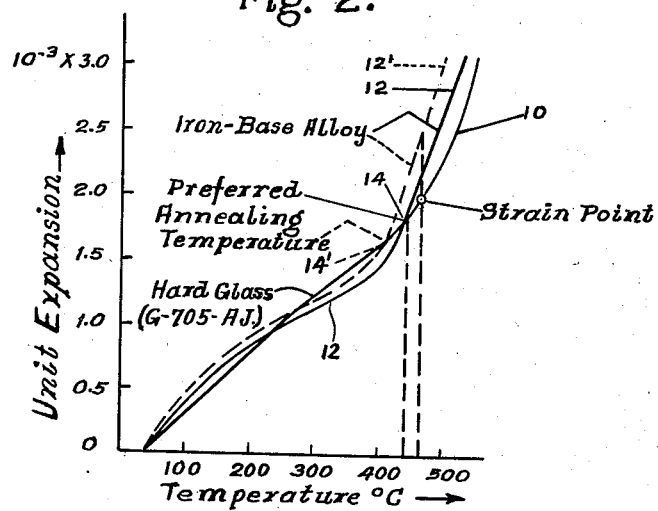
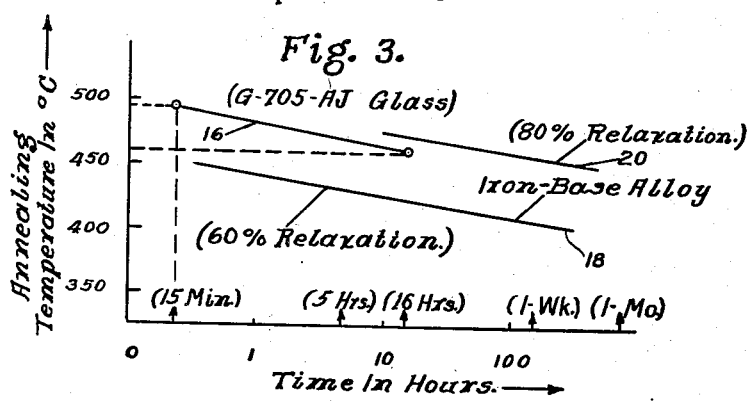
INVENTOR
Howard Scott.

Patented Dec. 1, 1936

2,062,836

UNITED STATES PATENT OFFICE 2,062,836

ANNEALING PROCESS

Howard Scott, Forest Hills, Wilkinsburg, Pa., assignor to Westinghouse Electric & Manufacturing Company, East Pittsburgh, Pa., a corporation of Pennsylvania Application October 15, 1935, Serial No. 45,053

8 Claims. (Cl. 49—81)

My invention relates to annealing processes and it has particular relation to an improved method for annealing seals between electrical insulating materials of the class typified by glass and metallic compositions of the class typified by ferrous-base alloys.

Vacuum-tight joints of this character are utilized in the construction of many electrical devices, particularly radio transmitting, rectifier, X-ray and other electronic tubes. For such applications, it is desirable to use a hard glass, that is, one that will soften to the point of flowing only when its temperature is raised much above that at which the ordinary or softer grades of glass are rendered plastic. As a criterion of this transition temperature the so-called "strain point" is frequently used. It is defined as the lowest temperature at which residual stresses will substantially vanish when the glass is maintained thereat for 16 hours.

The use of a high strain point glass is of advantage in that it makes possible a heating of the assembled apparatus to a temperature sufficiently high to secure, under vacuum, effective elimination of all gases from the enclosed metal and glass walls without danger of distortion or collapse of the vessel or other structure. Another advantage of the harder grades of glass is that their relatively lower expansivities allow the production of seals having correspondingly higher resistances to thermal shock.

Many metals heretofore widely used in glass sealing applications, notably copper, compounds and compositions of copper, tungsten and molybdenum, have recently been replaced by certain superior iron-base alloys which are low in cost, easily fabricated into convenient shapes, are readily "wet" by the glass to form a satisfactory union therewith and are not attacked by mercury vapor. Such alloys which are more completely described by my issued Patent 1,942,260 may be compounded from iron, nickel, cobalt and manganese, for example, to have mean expansivities very closely matching those of the described hard glasses from room temperature up to the "inflection" temperatures of the alloys which may approach though rarely exceed the strain points of these glasses.

The mentioned inflection temperature is defined as that above which the alloy expansivity increases rapidly. It is thus somewhat analogous to the strain point of the glass except, of course, that while the glass rapidly becomes plastic above its strain point the metal is not so rendered until heated to temperatures greatly in excess of the inflection value. Above the glass strain point, however, the resulting plasticity makes expansion differences of the metal being sealed into of little consequence.

While the iron-base alloys previously mentioned are suitable for sealing into hard glasses from the standpoint of having the desired low mean expansivities from room temperature up to their inflection temperatures, they are further characterized by having expansion-temperature curves which decrease in slope slowly as the temperature rises above room temperature and then start again to rise more rapidly as the inflection temperature is approached. The expansion curve of hard glass on the other hand, is nearly linear. Hence the curve of an iron-base alloy of comparable mean expansivity will ordinarily cross and recross that of the glass.

The desired condition that the two curves coincide both at room temperature and at or about the glass strain point or somewhat thereabove is not compatible with the requirement of a high strain point in the glass because of the manner in which the mean expansivity of the low-expansion iron-base alloys varies with inflection temperature. A high inflection temperature is accompanied by an elevated mean expansivity, and vice versa. Thus when the alloy is selected to have an inflection temperature as high as the strain point of the referred to hard glass, the mean expansivity of the alloy ordinarily exceeds that of the glass by an unpermissible amount.

In practice, therefore, the characteristics of the glass and the alloy are preferably so correlated that the expansion curve of the alloy will recross that of the glass at a temperature within the range of 100° C. below the glass strain point. In other words, the material composition selection preferably represents a compromise between the optimum mean expansivity and inflection temperature requirements.

Because of the above-stated differences in expansion characteristics which such a compromised selection involves, difficulty is experienced in keeping the stress from exceeding the glass-fracturing value when the union is cooled from the temperature of glass-fusion to room temperature.

The annealing treatment about to be described has been developed to obtain satisfactory stress release when the inflection temperature of the metal is substantially below the strain point of the glass into which the metal is sealed.

All past treatments with which I am familiar have involved subjection to a temperature considerably above the strain point of the glass followed by cooling at a critical and relatively slow rate to the strain point and thence to room temperature at a rate which may be less critical. This variable cooling control involves so many practical difficulties as to be objectionable. Such past treatments are, furthermore, ineffective in properly relieving the strains between many selections of hard glass and alloy compositions.

Generally stated, the object of my invention is to provide a process of annealing which facilitates the making of glass-to-metal seals of the above-described class and which broadens the range of material compositions which may successfully be joined.

Another object of my invention is to provide an annealing treatment for the above characterized type of glass-to-metal seals which may be carried on without the use of a furnace or control equipment other than that required to maintain a steady temperature.

A further object is to provide an annealing treatment which is relatively simple and which requires relatively little skill to carry out.

In practicing my invention, I select as the annealing temperature one at which the expansion curve of the metal crosses or coincides with that of the glass, both expansions being measured from room temperature, even though this so selected temperature may be considerably lower than the strain point of the glass. The advantage of such a selection is that as no further strains of permanent character can develop during the subsequent cooling to room temperature, no special control of the rate of cooling is required either preceding or after the anneal. When carried on from 2 to 18 hours, the stresses in both the glass and metal are sufficiently released to permit of an entirely satisfactory union.

My improved annealing treatment will best be understood through the following description of an illustrative example thereof, when taken in conjunction with the accompanying drawing, in which Figure 1 is a sectional view of one type of seal to which my new annealing treatment may with advantage be applied;

Fig. 2 is a diagram of curves applicable to a hard glass and an iron-base alloy having closely matched expansion characteristics illustrating the manner in which the annealing temperature involved by my new process is preferably chosen; and Fig. 3 is a diagram of curves illustrating certain stress relaxation properties of the alloy and glass compositions typified by the curves of Fig. 2.

In the making of seals or vacuum-tight joints, one tubular type of which is shown in Fig. 1, between hard glass and an appropriate iron base alloy, the materials of one preferred selection may have the relative expansion characteristics typified by curves 10 and 12 of Fig. 2. Curve 10 applies to a hard glass known in the trade as G-705-AJ, the approximate composition of which is 67% $SiO_2$, 22% $B_2O_3$, 7% $Na_2O+K_2O$ and 2% $Al_2O_3$. Curve 12 applies to an iron base metallic composition made up approximately of 53.8% iron, 29% nickel, 17% cobalt and 0.2% manganese.

At room temperature (25° C.) the two curves preferably coincide, as illustrated. The curve for the glass between that temperature and its strain point, previously defined as being the lowest temperature at which stresses can be released in a relatively long period such as 16 hours, very closely approaches a straight line representative of a mean expansivity of approximately $4.5 \times 10^{-6}/°$ C. The expansivity of other hard glasses having a high silica content seldom exceeds $6 \times 10^{-6}/°$ C. For hard glasses the strain point is usually above 450° C., it being 461° for the composition to which curve 10 applies. Below it the glass is a relatively non-plastic solid.

The described iron-base alloy (curve 12), while having a substantially equivalent mean expansivity between room temperature and the preferred annealing temperature, has a much less uniform rate of expansion as evidenced by the crossing and recrossing of curve 10 by curve 12. The inflection temperature, previously defined as being that above which the expansivity of the metal increases rapidly, is 430° for the composition described. Other iron-base alloys are capable of sealing directly into hard glasses but may also have inflection temperatures correspondingly lower than the strain points of the glasses when their expansion curves are adjusted to those of hard glass, as in the case described.

When a seal between materials such as are typified by curves 10 and 12 is annealed, as in accordance with prior art practice, at a temperature from 30° to 50° above the strain point of the glass, which temperature is sufficiently high to effect stress release in a period as short as 15 minutes, it is necessary, in order to prevent a development in the glass of residual stress of high magnitude to cool the seal very slowly from this relatively high annealing temperature to the strain point. This requirement of special temperature-change control makes the named form of treatment objectionable.

In accordance with my invention, this difficult control step is eliminated by immediately cooling the sealed materials at any convenient rate to a preselected temperature at or below the strain point of the glass, maintaining them at this temperature for a period varying from a few to a large number of hours, depending on the characteristics of the sealed materials, and then further cooling at any convenient rate to room temperature.

Selection of this lowered annealing temperature is preferably determined by the point 14 at which the alloy expansion curve 12 crosses the glass expansion curve 10. In the diagram of Fig. 2, this point corresponds to a temperature of 440°, at which the glass will still yield under stress though at a rate much slower than when annealed above or at the strain point. The stated manner of selection is satisfactory in all cases in which the point of curve crossing is not too far below the glass strain point. I have, for example, successfully annealed at 100° C. below the strain point. This difference, however, I believe closely approaches the maximum one feasible.

At the end of the relatively long annealing period such strains as may remain in the glass and the metal are relatively unharmful because there is no permanent increase in the stress when the seal is cooled to room temperature. If, on the other hand, the annealing were to be done at, or above the strain point while no appreciable stresses would remain at that temperature, high stresses would develop when cooled to room temperature. As before pointed out, in my improved process these objectionable strains are eliminated, and the temporary strains introduced in cooling down to room temperature by the divergence between the two curves are of insufficient magnitude to cause glass fracture during cooling. These vanish at room temperature where the curves again coincide.

Should the alloy be chosen to have a somewhat different curve 12' which recrosses the glass expansion curve at a lower point 14', then this lower point would be the one selected to carry out the annealing, unless, of course, it represented a temperature too much below the glass strain point.

Reference to Fig. 3 indicates that my new process is practically as effective in eliminating stresses as is the prior art form of treatment before discussed in which the annealing is carried on at a temperature above the strain point. For the G-705-AJ grade of hard glass typified by curve 16 in Fig. 3, the annealing would be in accordance with prior practice and be carried on for approximately 15 minutes at a temperature near 496° C. Were it to be carried on at the strain point (461° C.), 16 hours would be required to effect complete stress release.

Below the strain point, a corresponding increase in time, of course, is needed to effect complete stress release. The major portion of the stress in the glass disappears, however, within a few hours, as has been pointed out. A close approach to complete release is in practice found entirely satisfactory when the annealing is done at the specially selected lower temperature.

In addition, plastic deformation in the metal contributes materially to stress elimination in the glass as typified by curves 18 and 20 of Fig. 3 which give the times required to effect 60% and 80% complete stress relaxation of the iron-base alloy at particular temperatures. Consequently, in the process of my invention, the annealing seldom need be carried on for more than 16 or 20 hours at the most even when conducted at temperatures substantially below the strain point. In many cases even shorter periods of the order of from 2 to 6 hours, for example, are adequate.

Nor is the improved annealing treatment just described restricted in its application to seals between hard glass and iron-base alloys having the particular compositions described, since it may with equal success be advantageously applied even when the expansions of the glass and the metal match perfectly and, in fact to seals between any electrical insulating material and any metal having comparable relative expansivity and stress relaxation characteristics.

With its aid, I have successfully sealed a glass having an expansivity of $36\times10^{-6}/°$ C. and a strain point of 520° C. into an iron-base alloy having a mean expansivity of $4.3\times10^{-6}/°$ C. and an inflection temperature of 415° C. A glass having an expansivity of $4.6\times10^{-6}/°$ C. and strain point of about 440° C. closely approximates a perfect match with the same alloy. For that combination, the conventional or prior art annealing practice might, of course, also be used.

My preferred practice, however, is to make a compromised selection of materials, involving a glass of about $4.6\times10^{-6}/°$ C. expansivity and strain point of about 460° C., which combination can successively be annealed by the aid of my improved treatment here disclosed.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. A process for annealing glass-to-metal seals which consists in cooling the united materials from the fusing temperature to a temperature below the strain point of the glass, holding at that temperature for a time sufficient to release a major portion of the stresses in the sealed materials and then cooling at any convenient rate to atmospheric temperature.

2. The method of releasing the stresses in a fused union between a section of hard glass and a mating section of iron-base alloy which consists in cooling the union from the fusing temperature to a temperature below the strain point of the glass, holding at that temperature for a time sufficient to release a major portion of the stresses in the glass and then cooling at a relatively rapid rate to atmospheric temperature.

3. The method of releasing the stresses in a fused union or joint between a section of hard glass having a coefficient of expansion of less than $6.0\times10^{-6}/°$ C. and a strain point between 450° and 500° C. and a mating section of iron-base alloy having substantially the same mean expansivity and an inflection temperature substantially below 450° C. which consists in cooling the joined parts from the fusing temperature to a temperature of approximately 400° C., holding at that temperature for from 2 to 24 hours, and then cooling to atmospheric temperature.

4. The method of annealing fused seals between metals and glasses which consists in placing the seal while hot from fusion into an oven, maintaining the oven temperature at a given value within 100° of the strain point of the glass for a period of from 2 to 24 hours, and then removing from the oven and cooling to room temperature at a relatively fast rate.

5. The method of annealing fused seals between iron-nickel-cobalt-manganese alloys and mating sections of hard glass which consists in placing the seal while hot from fusion into an oven, maintaining the oven temperature at a given value within 100° of the strain point of the glass for a period of from 2 to 24 hours, and then removing from the oven and cooling to room temperature.

6. The method of annealing fused seals between metals and boro-silicate glasses having mean expansion coefficients less than $6.0\times10^{-6}/°$ C. which consists in placing the seal while hot from fusion into an oven, maintaining the oven temperature at a given value within 100° of the strain point of the glass for a period of from 2 to 24 hours, and then removing from the oven and cooling to room temperature.

7. The method of annealing seals between glass and a metal the expansivity of which varies considerably with temperature which consists in holding the fused union at a temperature close to or below the strain point of the glass for from 2 to 24 hours before cooling to room temperature.

8. The method of annealing seals between glasses and ferrous-base alloys having substantially equal expansion characteristics from room temperature to a temperature of within 100° C. of the glass strain point which consists in placing the freshly joined seal into an oven at or near the highest temperature of equal expansion of the joined materials and holding at that temperature for at least two hours before cooling to room temperature.

HOWARD SCOTT.